(12) United States Patent
Davies et al.

(10) Patent No.: US 10,899,974 B2
(45) Date of Patent: Jan. 26, 2021

(54) LIGHT OIL REFLUX HEAVIES REMOVAL PROCESS

(71) Applicant: CONOCOPHILLIPS COMPANY, Houston, TX (US)

(72) Inventors: Paul R. Davies, Houston, TX (US); Michael J. Calderon, Houston, TX (US); Dale L. Embry, Houston, TX (US); David W. Larkin, Houston, TX (US); Qi Ma, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 274 days.

(21) Appl. No.: 15/926,099

(22) Filed: Mar. 20, 2018

(65) Prior Publication Data

US 2018/0273858 A1    Sep. 27, 2018

Related U.S. Application Data

(60) Provisional application No. 62/474,151, filed on Mar. 21, 2017.

(51) Int. Cl.
| | | |
|---|---|---|
| *B01D 3/06* | (2006.01) | |
| *C10G 53/02* | (2006.01) | |
| *C10G 7/00* | (2006.01) | |
| *B01D 3/14* | (2006.01) | |
| *B01D 1/28* | (2006.01) | |

(52) U.S. Cl.
CPC ............... *C10G 53/02* (2013.01); *B01D 1/28* (2013.01); *B01D 3/06* (2013.01); *B01D 3/143* (2013.01); *C10G 7/00* (2013.01); *B01D 2256/24* (2013.01); *B01D 2257/7022* (2013.01); *C10G 2300/1025* (2013.01); *C10G 2300/1081* (2013.01); *C10G 2400/28* (2013.01)

(58) Field of Classification Search
CPC .... B01D 3/06; B01D 3/143; B01D 2256/245; B01D 2257/7022
See application file for complete search history.

(56) References Cited

U.S. PATENT DOCUMENTS

| | | | |
|---|---|---|---|
| 2,959,540 A | 11/1960 | Cahn | |
| 4,421,535 A | 12/1983 | Mehra | |
| 4,428,759 A * | 1/1984 | Ryan | F25J 3/0219 62/635 |
| 2002/0059865 A1 | 5/2002 | Lemaire et al. | |
| 2004/0200353 A1* | 10/2004 | Bras | F25J 3/0209 95/211 |
| 2005/0218041 A1* | 10/2005 | Yoshida | F25J 3/0238 208/340 |
| 2005/0284176 A1* | 12/2005 | Eaton | F25J 3/0238 62/613 |
| 2008/0016910 A1 | 1/2008 | Brostow et al. | |
| 2010/0000255 A1 | 1/2010 | Mak | |
| 2013/0061632 A1* | 3/2013 | Brostow | F25J 1/0045 62/611 |
| 2014/0260417 A1* | 9/2014 | Herzog | F25J 3/0233 62/611 |
| 2017/0176099 A1* | 6/2017 | Gaskin | F25J 3/0295 |

OTHER PUBLICATIONS

International Search Report, PCT/US2018/023313, dated Aug. 6, 2018; 3 pgs.

* cited by examiner

*Primary Examiner* — Randy Boyer
(74) *Attorney, Agent, or Firm* — ConocoPhillips Company

(57) ABSTRACT

The invention relates to various nonlimiting embodiments that include methods, apparatuses or systems for processing natural gas comprising a heavies removal column processing natural gas and light oil reflux. The overhead stream goes to heavies treated natural gas storage. The heavies removal column reboiler bottoms stream product is input to a debutanizer column. The debutanizer column overhead lights are input to a flash drum where the bottoms is pumped through a heat exchanger as a light oil reflux input to the heavies removal column, while the debutanizer reboiler bottoms product is stored as stabilized condensate. Alternatively, debutanizer column overhead lights are sent to heavies treated gas storage and the bottoms stream product goes to a depentanizer column, the overhead lights are pumped through a heat exchanger as a light oil reflux input to the heavies removal column, while the depentanizer reboiler bottoms product is stabilized condensate.

6 Claims, 3 Drawing Sheets

LIGHT OIL REFLUX HEAVIES REMOVAL PROCESS

CROSS-REFERENCE TO RELATED APPLICATIONS

This application is a non-provisional application which claims benefit under 35 USC § 119(e) to U.S. Provisional Application Ser. No. 62/474,151 filed Mar. 21, 2017, entitled "LIGHT OIL REFLUX HEAVIES REMOVAL PROCESS," which is incorporated herein in its entirety.

STATEMENT REGARDING FEDERALLY SPONSORED RESEARCH OR DEVELOPMENT

None.

FIELD OF THE INVENTION

The present invention relates generally to a method and apparatus for processing natural gas. In another aspect, methods and apparatus are provided for removing heavies from natural gas using a light oil reflux in a heavies removal unit.

BACKGROUND OF THE INVENTION

In the processing of natural gas there are several challenges with the existing heavies removal processes. In the current heavies removal system for the LNG Optimized Cascade Process, as the natural gas feed becomes leaner in C2 through C5, but not in C6+ components, an increased lean reflux rate to the heavies removal column results. The rate increases in order to remove C6+ components. This in turn results in increased process operating and capital expenditures as a result of increased natural gas flow to the compressors in the reflux loop (i.e. the reflux stream is sent to compressors while still a gas before being condensed and directed to the heavies removal column).

BRIEF SUMMARY OF THE DISCLOSURE

Various nonlimiting embodiments include methods, apparatuses or systems for processing natural gas comprising a heavies removal column receiving and processing natural gas and light oil reflux. The first overhead stream goes to heavies treated natural gas storage. The heavies removal column reboiler bottoms stream product is input to a debutanizer column. The debutanizer column overhead lights go to a flash drum where flash drum bottoms is pumped through a heat exchanger as a light oil reflux input to the heavies removal column, while the debutanizer reboiler bottoms product is routed to stabilized condensate storage. Alternatively, debutanizer column overhead lights are sent to heavies treated gas storage and the bottoms stream product goes to a depentanizer column, where the overhead lights are pumped through a heat exchanger as a light oil reflux input to the heavies removal column, while the depentanizer reboiler bottoms product is routed to stabilized condensate storage.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

One of the main issues with the current heavies removal system in the LNG Optimized Cascade Process is that as the natural gas feed becomes leaner in C2 through C5, but not in C6+ components, this results in increased lean reflux rate to the heavies removal column in order to remove C6+ components. This in turn increases process opex and capex as a result of increased natural gas flow to the compressors in the reflux loop when the reflux stream is sent to compressors while still a gas before being condensed and directed to the heavies removal column.

Embodiments disclosed herein improve processing by replacing the lean reflux stream with a light oil reflux stream. The light oil stream eliminates the need for reflux gas compression and increases the separation efficiency of the heavy components from the natural gas via either a C4-C5 reflux stream or external condensate stream. The methods, processes and systems disclosed herein reduce the opex and potentially the capex of the heavies removal process by reducing the need for gas compression. Due to its ability to use an external condensate stream it also has the ability to run leaner feeds than the current process.

The Liquefied Natural Gas (LNG) Optimized Cascade Process uses a heavies removal distillation column to eliminate C6+ hydrocarbons (i.e. heavy components) from the natural gas prior to condensing the gas to LNG (Note: Gas has already been amine treated and dehydrated prior to heavies removal). Heavies removal is done to prevent freezing from occurring in the liquefaction heat exchangers and to moderate the heating value of the LNG. It also prevents LNG from going off spec due to increased levels of heavy components.

The following examples of certain embodiments of the invention are given. Each example is provided by way of explanation of the invention, one of many embodiments of the invention, and the following examples should not be read to limit, or define, the scope of the invention.

Figure 1:
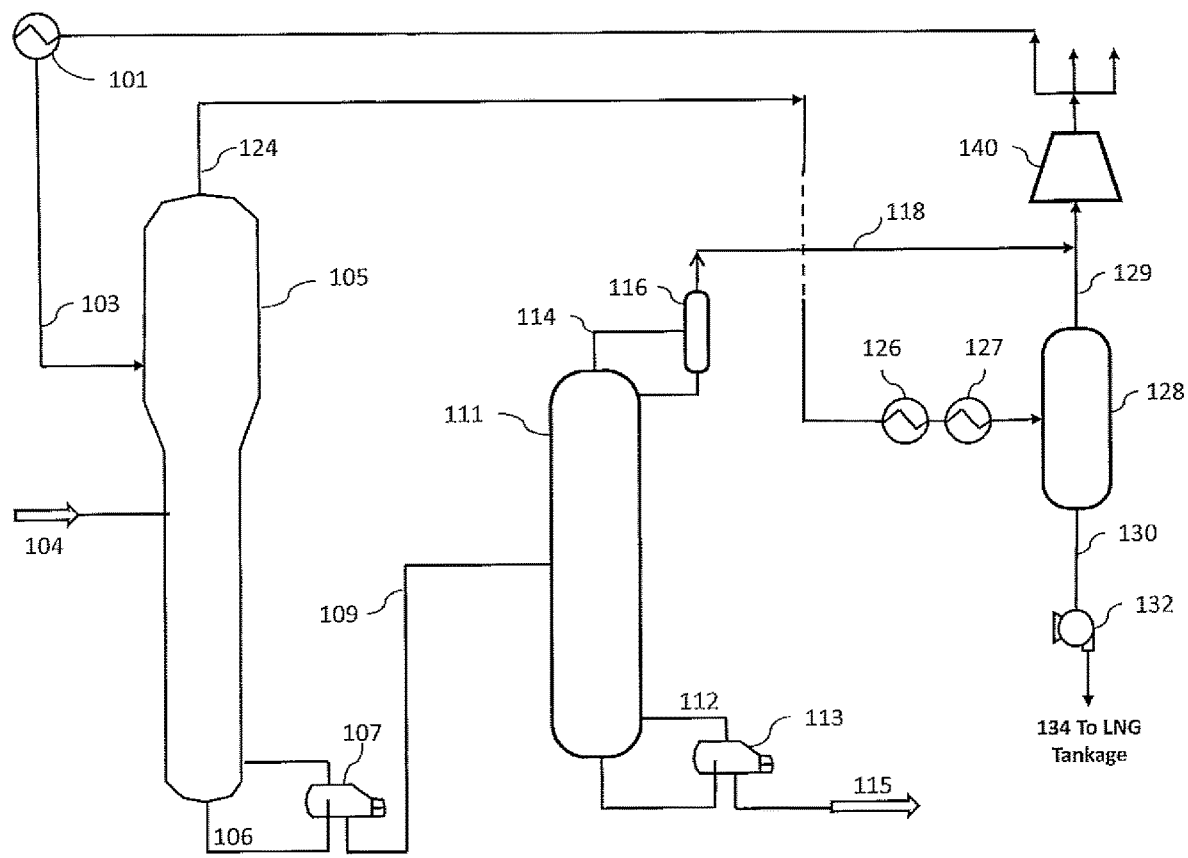
FIG. 1 illustrates a heavies removal process using an external lean reflux.

As illustrated in FIG. 1, a simplified diagram of a lean reflux heavies removal process 100, the heavies removal process includes feeding chilled external lean reflux natural gas 103, which has been piped through heat exchanger 101 to the top of the heavies removal column 105 where most of the C6+ components are removed. The heavies removal column 105 also receives a natural gas feed 104 to be processed. The heavies liquid bottom stream 106, passes through reboiler 107, the bottom stream product 109 is then sent to a stabilizer (or debutanizer) column 111 where the debutanizer bottom stream 112 is passed through reboiler 113 and as the heavier components are removed as a bottom stream product as stabilized condensate 115 for sale. The lighter overhead components 114 are separated with condenser 116 into a methane rich recycle stream and external lean reflux stream 118 that is sent to compressors 140 and may be sent to heat exchanger 101 for delivery as external lean reflux 103 to the heavies removal column 105. The heavies treated natural gas 124 exits the top of the heavies removal column 105. This overhead stream 124 can now be further cooled by one or more heat exchangers 126, 127 and pass into flash drum 128 to be separated as overhead 129 to deliver to compressors 140, or exit the flash drum bottom outlet as distillate 130 and be pumped 132 to LNG storage/tankage 134.

In contrast to 100, the system, methods and apparatus disclosed herein provide for reducing the opex and potentially the capex of the heavies removal process by reducing the need for gas compression. The invention also increases the separation efficiency of the heavy components from the natural gas via either a C4-C5 reflux stream or external condensate stream. Embodiments disclosed here also have the flexibility of blending back in some of the condensed depentanizer overhead into its bottom stream if needed. In addition, condensate can also be injected into the depentanizer in cases where increased reflux is needed to remove heavies from the natural gas feed. This, therefore, allows improved processing compared to processing very lean gas feeds in a two or three column design without condensate injection. Also, due to operating conditions in the plant, minimal losses of injected condensate are expected. Finally, the optional outside condensate allows simple startup for very lean feeds and minimal required storage.

Figure 2:
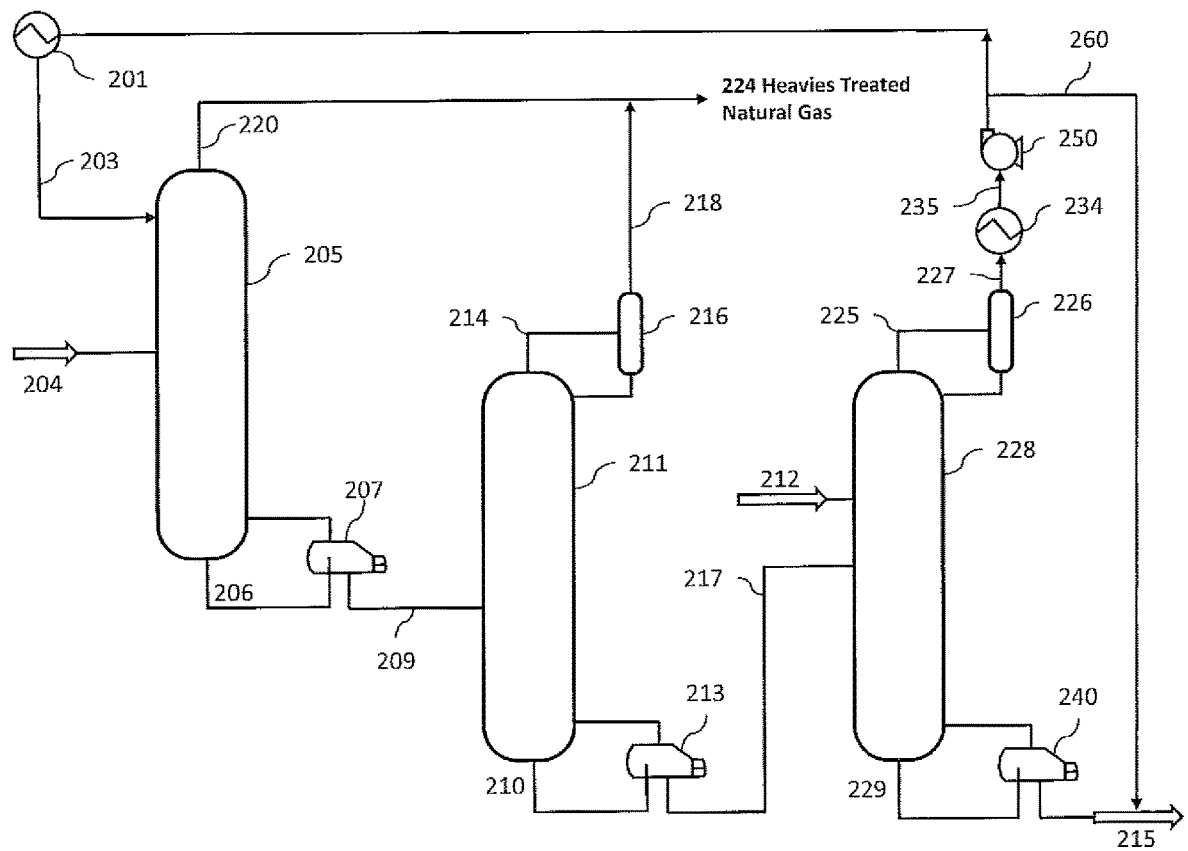
FIG. 2 illustrates a heavies removal unit design using a light oil reflux.

FIG. 2 is a diagram of a light oil reflux heavies removal process 200. Nonlimiting embodiments of the system, methods and apparatus disclosed herein provides for replacing the LNG reflux stream 203 with a light oil reflux stream (C4-C5) or external condensate stream 212. As illustrated in FIG. 2, the light oil reflux stream 203 (or external condensate stream) is fed to the heavies removal column 205 to remove the C6+ components within the natural gas feed 204. The resulting liquid bottom stream 206 is then fed to the debutanizer followed by a depentanizer to stabilize the condensate for sale (Note: Optionally, the columns can be a depropanizer followed by a debutanizer). After the resulting heavies removal column bottom liquid stream 206 passes through reboiler 207, the resulting liquid bottom product stream 209 passes into the depentanizer 211. The lighter elements 214 in the overhead of the debutanizer 211 are separated with condenser 216 and the overhead lights 218 sent to the heavies treated natural gas 224. The overhead from the depentanizer column 228 is treated to obtain a light oil reflux 203 and/or stabilized condensate 215.

In more specificity, an apparatus or system for processing natural gas comprises a heavies removal column 205 that has a natural gas feed 204 inlet and a light oil reflux feed 203 inlet, the natural gas feed inlet being at a lower elevation than the light oil reflux gas feed inlet, and a first overhead outlet for sending a first overhead stream 220 to a heavies treated natural gas storage 224. A first reboiler 207 is downstream from a bottoms outlet of the heavies removal column 205, the first reboiler 207 receives a heavies removal column bottoms stream 206. A debutanizer column 211 is downstream from the first reboiler 207 for receiving a first reboiler bottoms stream product 209. The debutanizer column 211 has a first condenser 216 and a second reboiler 213. The second reboiler 213 produces a second reboiler bottoms stream product 217. The first condenser 216 partially separates a debutanizer overhead stream 214 into a debutanizer overhead stream lights 218 that may be routed to heavies treated natural gas storage 224. A depentanizer column 228 downstream of the second reboiler 213 for receiving the second reboiler bottoms stream product 217, the depentanizer column 228 comprising, a second reboiler bottom stream product inlet, a second condenser 226 and a third reboiler 240, wherein the depentanizer column 228 also comprises an inlet for an optional condensate stream feed 212, the second condenser 226 for partially separating a depentanizer overhead stream 225 into depentanizer overhead stream lights 227. The heavies liquid bottom stream 229, passes through reboiler 240, and the heavier components are removed as a bottom stream product as stabilized condensate 215 for sale. A first heat exchanger 234 is downstream of the second condenser 226, the first heat exchanger 234 for obtaining a light oil 235. A pump 250 is downstream from the first heat exchanger 234 for pumping the light oil 235 to a second heat exchanger 201 downstream from the pump 250, the second heat exchanger 201 for providing the light oil reflux 203. The heavies removal column light oil reflux feed inlet is downstream from the second heat exchanger.

In another aspect, the heavies treated natural gas storage is downstream from the overhead outlet of the heavies removal column. A compressor may be downstream from the overhead outlet of the heavies removal column for compressing heavies treated natural gas or downstream from an overhead outlet of the flash drum for compressing heavies treated natural gas. Also, a stabilized condensate storage reservoir may be downstream from the third reboiler.

Similarly a method for natural gas processing is illustrated with FIG. 2, including introducing a natural gas feed 204 and a light oil reflux gas feed 203 to the heavies removal column 205. The natural gas feed 204 and the light oil reflux gas feed 203 is processed in the heavies removal column 205 to produce a first bottoms stream 206 and a first overhead stream 220, wherein the first bottoms stream 206 is routed to a first reboiler 207, and the first reboiler bottoms stream product 209 is routed to a debutanizer column 211, and the heavies removal column overhead stream 220 is routed to heavies treated natural gas storage 224. The first reboiler bottoms stream product 209 is processed in the debutanizer column 211 to produce a second bottoms stream 210 and a second overhead stream 214, wherein the second bottoms stream 210 is routed to a second reboiler 213 and then the second reboiler bottom stream product 217 is input to a depentanizer column 228, and the second overhead stream 214 is routed through a condenser 216 for partial separation of the second overhead stream 214 into second overhead stream lights 218 that is routed to heavies treated natural gas storage 224. The second reboiler bottom stream product 217 is processed in the depentanizer column 228 to produce a third bottoms stream 229 and a third overhead stream 225, wherein the third bottoms stream 229 is routed to a third reboiler 240 and wherein the third reboiler bottom stream product 215 is routed as a stabilized condensate to storage, and the third overhead stream 225 is routed through a condenser 226 for partial separation of the third overhead stream 225 into third overhead stream lights 227. The third overhead stream lights 227 is routed to a first heat exchanger 234 to obtain a light oil 235. The light oil 235 is routed through a pump 250 to a second heat exchanger 201 to obtain a light oil reflux 203 and provide the light oil reflux 203 to the heavies removal column 205.

In other aspects, the heavies treated natural gas from the heavies removal column may be routed to a compressor for storage of heavies treated natural gas. The light oil reflux feed inlet is positioned on the heavies removal column at a higher elevation than the natural gas feed inlet. An optional condensate stream 212 is introduced to the depentanizer column. This condensate stream introduced to the depentanizer may comprise butane and pentane.

These embodiments eliminate the need for reflux gas compression. In fact, the overall energy usage of heavies removal is reduced, for example, on one lean natural gas feed by over 80% as compared to the conventional processes. In addition, it increases the separation efficiency of the heavy components from the natural gas via either a C4-C5 reflux stream and/or external condensate stream. In the case of 200 the external stream 212 can be inputted into the process via the depentanizer 228. Also, the system, methods and apparatus provided has the flexibility of blending back in some of the condensed depentanizer overhead 225 into its bottom stream output by routing the depentanizer overhead 225 through the condenser 226, the heat exchanger 234, to pump 250, then by path 260 routing to storage or sale as stabilized condensate 215.

Figure 3:
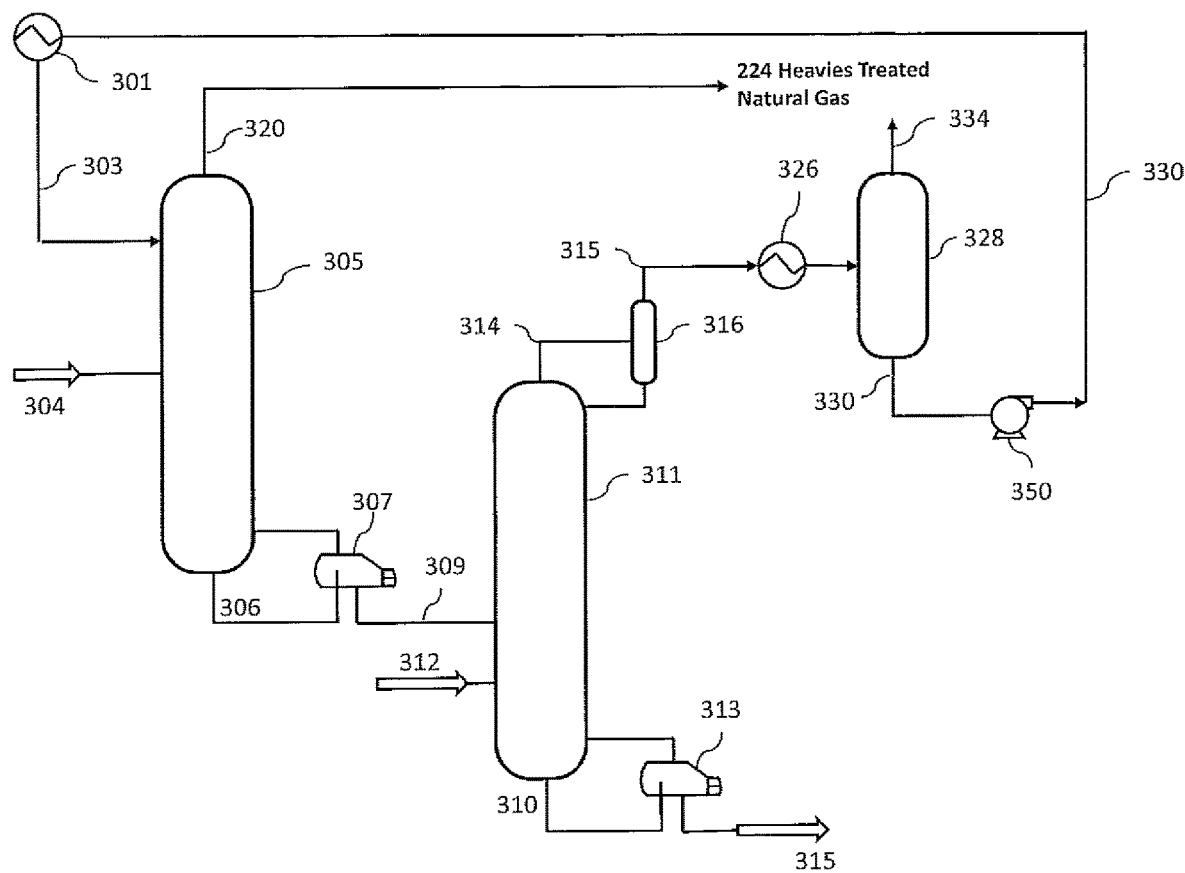
FIG. 3 illustrates an alternative heavies removal unit design using a light oil reflux.

An alternative process to the illustration in 200 is illustrated with the diagram of FIG. 3, an alternate simplified diagram of light oil reflux heavies removal process 300. The system, methods and apparatus provides for replacing a LNG reflux stream with a light oil reflux stream (C4-C5) 303.

As illustrated in FIG. 3, a method for natural gas processing includes introducing a natural gas feed 304 and a light oil reflux gas feed 303 to a heavies removal column 305. The natural gas feed 304 and the light oil reflux gas feed 303 are processed in the heavies removal column 305 to produce a first bottoms stream 306 and a first overhead stream 320. The first bottoms stream 306 is routed to a first reboiler 307 to separate a first reboiler bottom stream product 309 and then route the first reboiler bottom stream product 309 to a debutanizer column 311 and the first overhead stream 320 is routed to heavies treated natural gas storage 324. The first reboiler bottoms stream product 309 is processed in the debutanizer column 311 to produce a second bottoms stream 310 and a second overhead stream 314. The second bottoms stream 310 is routed to a second reboiler 313 and then the second reboiler bottom stream product 315 is routed to stabilized condensate storage. The second overhead stream 314 is routed through a condenser 316 for partial separation of the second overhead stream 314 into second overhead stream lights 315. The second overhead stream lights 315 is routed to a first heat exchanger 326 and then the first heat exchanger lights 327 are routed to a flash drum 328. In the flash drum 328, the first heat exchanger lights 327 are separated into a flash drum bottoms light oil reflux stream 330 and a flash drum overhead heavies treated natural gas 334. The heavies treated natural gas 334 is routed from the flash drum overhead outlet to heavies treated natural gas storage 324 and the flash drum bottoms light oil reflux stream 330 is routed through a pump 350 to a second heat exchanger 301 to obtain the light oil reflux gas feed 303.

In other aspect the heavies treated natural gas is routed from the flash drum to a compressor for storage of heavies treated natural gas. The light oil reflux feed inlet is positioned on the heavies removal column at a higher elevation than the natural gas feed inlet. A condensate stream 312 may be introduced to the debutanizer column 311. This condensate stream introduced to the debutanizer may comprise of butanes and pentanes. The light oil reflux may predominantly include one or more of isobutane, normal butane, and isopentane and normal pentane.

Other nonlimiting embodiments provided herein, also illustrated with FIG. 3, include an apparatus or system for processing natural gas that includes a heavies removal column 305 comprising a natural gas feed 304 inlet and a light oil reflux 303 feed inlet, with the natural gas feed inlet at a lower elevation than the light oil reflux gas feed inlet. A first reboiler 307 is downstream from a bottoms outlet of the heavies removal column 305 for receiving a bottoms stream 306 from a bottoms outlet of the heavies removal column 305. A debutanizer column 311 is downstream from the first reboiler 307, the debutanizer column 311 comprising an inlet for a first reboiler bottoms stream product 309, a first condenser 316 and a second reboiler 313. The debutanizer column 311 may have an inlet for an optional condensate stream 312 feed. The first condenser 316 is to partially separate a natural gas overhead 314 into first condenser overhead stream lights 315. A first heat exchanger 326 is downstream of the first condenser 316 for producing first heat exchanger overhead stream lights 327. A flash drum 328 is downstream from the first heat exchanger 326 and is configured to separate, from the first heat exchanger overhead stream lights 327, heavies treated natural gas 334 expelled though the flash drum 328 overhead outlet, and a light oil reflux stream 330 expelled from the flash drum 328 bottoms outlet. A pump 350 is downstream from the bottoms outlet of the flash drum 328 to pump the light reflux stream 330 to a second heat exchanger 301 downstream of the pump 350, which second heat exchanger is upstream to the heavies removal column light oil reflux feed inlet.

In other aspects a heavies treated natural gas storage is located downstream from the overhead outlet of the heavies removal column. A compressor may be downstream from an overhead outlet of the heavies removal column for compressing heavies treated natural gas. Also a compressor may be downstream from an overhead outlet of the flash drum for compressing heavies treated natural gas. Further, there may be a stabilized condensate storage reservoir downstream from the reboiler of the debutanizer column.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

What is claimed is:

1. A method for natural gas processing comprising:
   a) introducing a natural gas feed to a heavies removal column;
   b) introducing a light oil reflux gas feed to the heavies removal column;
   c) processing the natural gas feed and the light oil reflux gas feed in the heavies removal column to produce a first bottoms stream and a first overhead stream, wherein the first bottoms stream and the first overhead stream are separate streams upon expulsion from the heavies removal column, wherein the first bottoms stream is routed to a first reboiler to separate a first reboiler bottom stream product and then route the first reboiler bottom stream product to a debutanizer column and the first overhead stream is routed to heavies treated natural gas storage;

d) processing the first reboiler bottoms stream product in the debutanizer column to produce a second bottoms stream and a second overhead stream, wherein the second bottoms stream and the second overhead stream are separate streams upon expulsion from the debutanizer column, wherein the second bottoms stream is routed to a second reboiler to generate a second reboiler bottom stream product that is routed to stabilized condensate storage, and the second overhead stream is routed through a condenser for partial separation of the second overhead stream into second overhead stream lights;

e) routing the second overhead stream lights to a first heat exchanger and then routing the second overhead stream lights to a flash drum;

f) separating, in the flash drum, the second overhead stream lights into a flash drum bottoms light oil reflux stream and a flash drum overhead heavies treated natural gas; and g) routing the heavies treated natural gas from a flash drum overhead outlet to heavies treated natural gas storage and routing the flash drum bottoms light oil reflux stream through a pump to a second heat exchanger to obtain a light oil reflux gas feed.

2. The method of claim 1 further comprising:
routing the heavies treated natural gas from the flash drum to a compressor for storage of heavies treated natural gas.

3. The method of claim 1 wherein a light oil reflux feed inlet is positioned on the heavies removal column at a higher elevation than a natural gas feed inlet.

4. The method of claim 1 further comprising:
introducing a condensate stream to the debutanizer column.

5. The method of claim 4 wherein the condensate stream introduced to the debutanizer column comprises butane and pentane.

6. The method of claim 1 wherein the light oil reflux comprises a predominant composition of one selected from the group consisting of: i) isopentane, ii) normal pentane, and iii) isopentane and normal pentane.

\* \* \* \* \*